United States Patent
Ellmauthaler et al.

(10) Patent No.: US 10,180,515 B2
(45) Date of Patent: Jan. 15, 2019

(54) TRACE DOWNSAMPLING OF DISTRIBUTED ACOUSTIC SENSOR DATA

(71) Applicant: Halliburton Energy Services, Inc., Houston, TX (US)

(72) Inventors: Andreas Ellmauthaler, Rio de Janeiro (BR); Mark Elliott Willis, Katy, TX (US); Victor King Hong Leung, Houston, TX (US); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 295 days.

(21) Appl. No.: 14/912,270

(22) PCT Filed: Sep. 8, 2015

(86) PCT No.: PCT/US2015/048968
§ 371 (c)(1),
(2) Date: Feb. 16, 2016

(87) PCT Pub. No.: WO2016/053582
PCT Pub. Date: Apr. 7, 2016

(65) Prior Publication Data
US 2016/0252651 A1 Sep. 1, 2016

Related U.S. Application Data

(60) Provisional application No. 62/058,482, filed on Oct. 1, 2014.

(51) Int. Cl.
*G06F 11/30* (2006.01)
*G01V 11/00* (2006.01)
(Continued)

(52) U.S. Cl.
CPC .......... *G01V 11/002* (2013.01); *E21B 47/123* (2013.01); *G01H 9/004* (2013.01);
(Continued)

(58) Field of Classification Search
CPC .................................................. G01V 11/002
See application file for complete search history.

(56) References Cited

U.S. PATENT DOCUMENTS 5,850,369 A 12/1998 Rorden et al.
2006/0287830 A1* 12/2006 Tang ...................... G01V 1/364
702/13

(Continued)

FOREIGN PATENT DOCUMENTS

WO 2013/052423 A2 4/2013
WO WO2013/052423 * 11/2013

OTHER PUBLICATIONS

International Preliminary Report on Patentability issued in related Application No. PCT/US2015/048968, dated Apr. 13, 2017 (13 pages).

(Continued)

*Primary Examiner* — Phuong Huynh
(74) *Attorney, Agent, or Firm* — Benjamin Fite; Baker Botts L.L.P.

(57) ABSTRACT

In accordance with embodiments of the present disclosure, systems and methods for downsampling DAS data in a way that enables accurate interpretation of acoustic events occurring in the data are provided. Such methods may be particularly useful when interpreting large sets of data, such as DAS VSP data collected during hydrocarbon recovery operations. The methods generally involve identifying data channels affected by noise from a DAS data set, and then interpolating from the surrounding data. This may improve the quality of the resulting downsampled data, with respect to the signal to noise ratio, compared to what would have occurred by merely decimating unwanted data channels. In (Continued)

addition, a priori information about channel fading, the desired downsampling rate, and the slowest expected elastic waves may be used to filter the DAS data. This may achieve a higher signal-to-noise ratio in the downsampled data.

20 Claims, 12 Drawing Sheets

(51) Int. Cl.
  *G01V 1/40* (2006.01)
  *G01V 1/48* (2006.01)
  *E21B 47/12* (2012.01)
  *G01H 9/00* (2006.01)

(52) U.S. Cl.
  CPC .................. *G01V 1/40* (2013.01); *G01V 1/48* (2013.01); *G01V 2210/324* (2013.01); *G01V 2210/57* (2013.01)

(56) References Cited

U.S. PATENT DOCUMENTS

| | | |
|---|---|---|
| 2009/0097356 A1 | 4/2009 | Haldorsen et al. |
| 2012/0181420 A1 | 7/2012 | Duncan et al. |

OTHER PUBLICATIONS

H. Igehy and L Pereira, "Image Replacement through Texture Synthesis", Proceedings of the 1997 IEEE International Conference on Image Processing, pp. 186-189.

\* cited by examiner

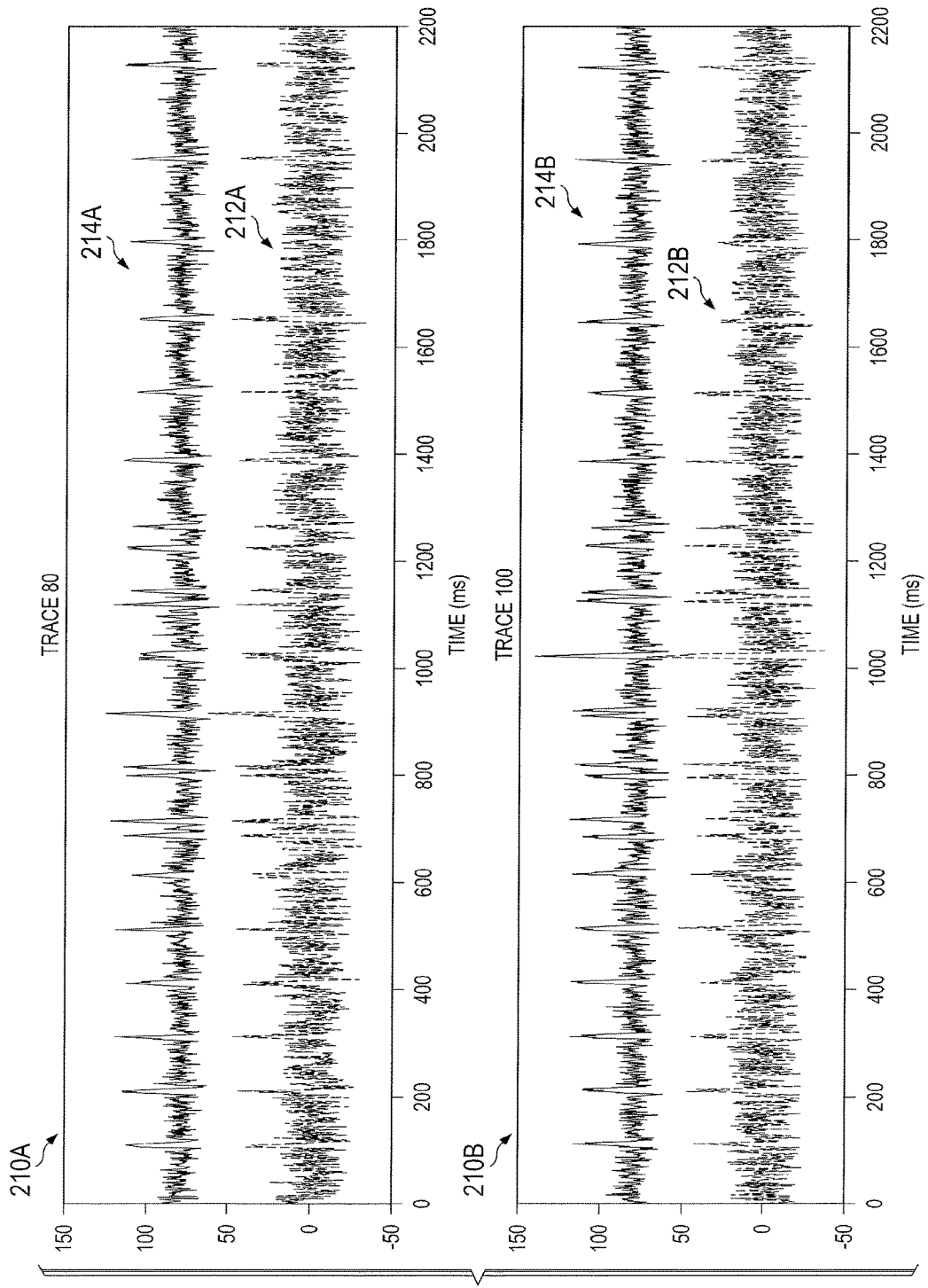

TRACE DOWNSAMPLING OF DISTRIBUTED ACOUSTIC SENSOR DATA

CROSS-REFERENCE TO RELATED APPLICATION

The present application is a U.S. National Stage Application of International Application No. PCT/US2015/048968 filed Sep. 8, 2015, which claims priority to U.S. Provisional Patent Application No. 62/058,482 filed Oct. 1, 2014, both of which are incorporated herein by reference in their entirety for all purposes.

TECHNICAL FIELD

The present disclosure relates generally to downhole drilling operations and, more particularly, to downsampling distributed acoustic sensing (DAS) data.

BACKGROUND

An optical distributed acoustic sensing (DAS) system uses an optical waveguide, such as an optical fiber, as a distributed sensor to measure the properties of acoustic waves that strain the waveguide. This sensing is performed by interrogating the backscattered light returning from the waveguide. Changes in the backscattered light can indicate not only the presence of acoustic waves, but also certain characteristics of the acoustic waves.

During hydrocarbon recovery operations, including well drilling, it is common to use DAS systems to acquire vertical seismic profile (VSP) data along the length of a wellbore. Such VSP data can include thousands of channels of seismic data, and it is sometimes desirable to downsample the number of channels of data by a factor of two or more. However, due to the nature of the fundamental physics of the measurement method, the data may be subject to noise that corrupts the spatial consistency of the seismic measurements across adjacent channels. This noise can be caused by various sources, such as external sources (e.g., environmental disruptions, surface acoustic waves, nearby drilling), time-varying noise sources within a fiber (e.g., polarization fading or Rayleigh fading), and increased noise levels near the waveguide termination. The resulting variations in the measured characteristics of the acoustic waves which impinge on the waveguide make it difficult to interpret and properly downsample measurements made by the DAS system.

Thus, it will be appreciated that improvements are continually needed in the art of interpreting DAS data collected in conjunction with subterranean wells. Such improvements could be useful for evaluating data collected from well acoustic sensing systems other than optical DAS systems, such as well acoustic sensing systems which include arrays of multiplexed point sensors (e.g., fiber Bragg gratings), or non-optical distributed acoustic sensing systems.

BRIEF DESCRIPTION OF THE DRAWINGS

For a more complete understanding of the present disclosure and its features and advantages, reference is now made to the following description, taken in conjunction with the accompanying drawings, in which:

FIG. 12 illustrates the effect of a zeroing, interpolating, filtering, and downsampling process on two channels of simulated DAS VSP data, according to aspects of the present disclosure.

Figure 1:
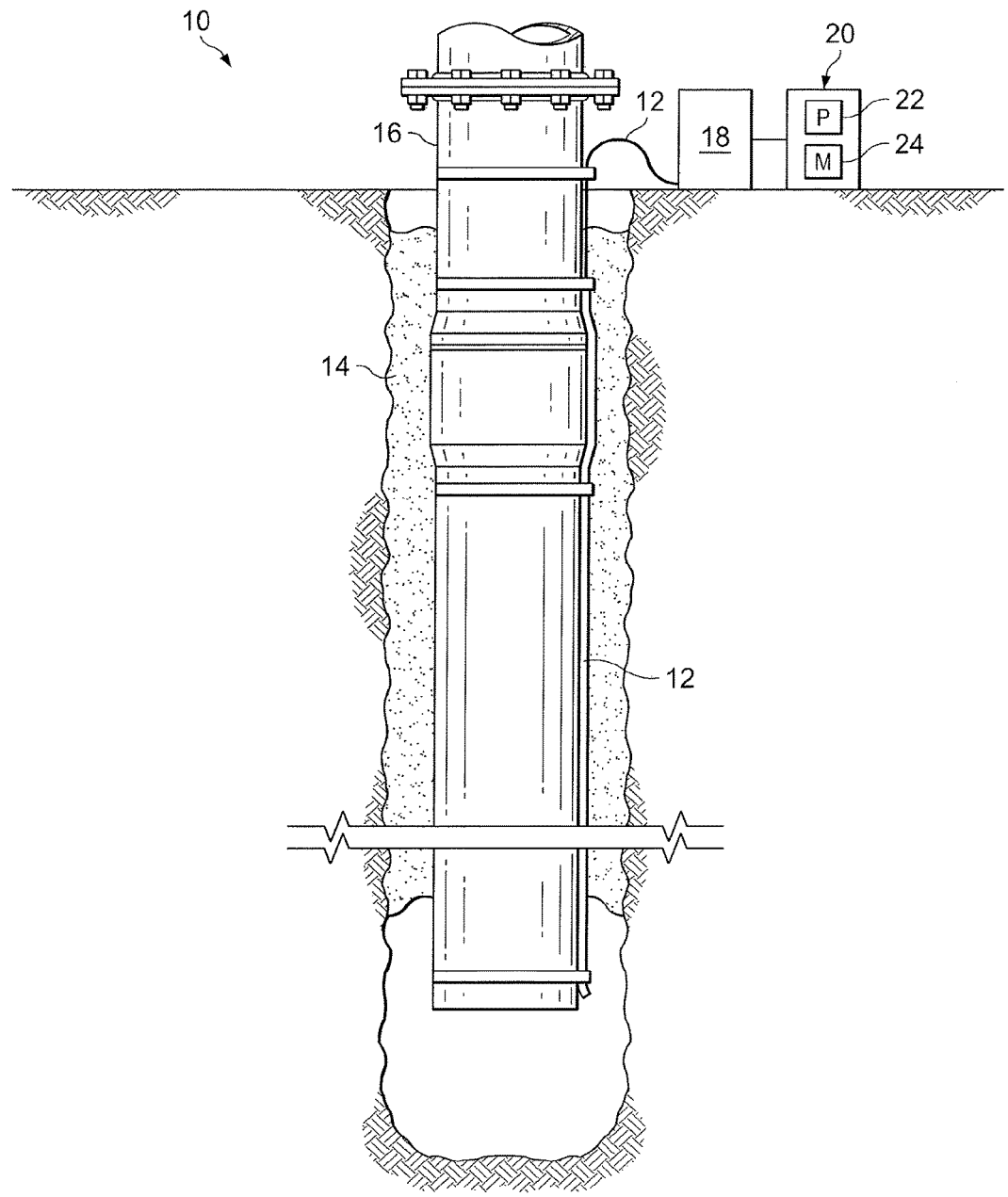
FIG. 1 is a partial cross sectional view of a wellbore system with a fiber optic cable for collecting distributed acoustic sensing (DAS) vertical seismic profile (VSP) data measurements, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation are described in this specification. It will, of course, be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for improving the accuracy of interpretation of distributed acoustic sensing (DAS) data. Specifically, the disclosed embodiments are directed to systems and methods for downsampling large amounts of DAS data in a way that enables accurate interpretation of acoustic events occurring in the data with a high signal-to-noise ratio. Such methods for downsampling DAS data may be particularly useful when interpreting large sets of data such as, for example, DAS vertical seismic profile (VSP) data collected during hydrocarbon recovery operations.

During such operations, including well drilling, it is common to use DAS systems to collect VSP data along the length of a wellbore. Such VSP data may contain thousands of channels of seismic data, and it is sometimes desirable to downsample the number of channels of data by a factor of two or more. However, due to the nature of the fundamental physics of the measurement method, the data may be subject to noise that corrupts the spatial consistency of the seismic measurements across adjacent channels. This may introduce unwanted spatial high-frequency information that needs to be removed before downsampling the data.

According to aspects of the present disclosure, data channels affected by noise may be identified, removed from the data set, and then interpolated from the surrounding data. By doing so, the spatial consistency between neighboring channels may be conserved and aliasing distortion effects in the final downsampled data may be avoided. This may allow for the final downsampled data to be of higher quality, with respect to the signal to noise ratio, than would have occurred by merely removing unwanted data channels.

According to other aspects of the present disclosure, a priori information about channel fading, the desired downsampling factor, and the expected slowest velocity of elastic waves may be used to filter the DAS data. These aspects may collectively help achieve a higher signal-to-noise ratio in the downsampled data.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near-surface construction purposes or borehole u-tube pipelines used for the transportation of fluids such as hydrocarbons. Embodiments described below with respect to one implementation are not intended to be limiting.

Some or all of the aspects of the present disclosure may be implemented in an information handling system or computing system, both of which may be used interchangeably herein. Example information handling systems include server systems, computer terminals, handheld computing devices, tablets, smartphones, etc. For purposes of this disclosure, an information handling system or computing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include at least a processing component and a memory component. For example, the processing component may include one or more processing resources such as a central processing unit (CPU) or hardware or software control logic. The memory component may include, for example, random access memory (RAM) and/or ROM (or other types of nonvolatile memory). The processing component may be operably coupled to the memory component to execute instructions for carrying out the presently disclosed techniques. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

As described herein, DAS VSP data sets may include thousands of channels of acoustic data recorded using a fiber optic cable, as shown in the wellbore environment 10 of FIG. 1. The fiber optic cable 12 may be placed vertically in a wellbore 14 such that each of the channels may correspond to a different distance from the opening of the wellbore 14. For example, in embodiments with vertical wellbores, each channel may correspond to a different depth of data measurement. While the fiber optic cable 12 may be cemented behind a casing 16 or tubing, as depicted in FIG. 1, the fiber optic cable 12 may be positioned in the wellbore 14 in a number of ways, such as clamped outside of a tubing or casing, run with production tubing (e.g. clamped onto the production tubing string), or hung freely in the wellbore, including fiber optic cable run with a wireline or sliekline tool.

A DAS interrogator box 18 may measure backscatter from a pulse of laser light sent along the fiber optic cable 12 to capture a time sample of acoustically-induced strain (e.g., stretching, compression) along the entire fiber cable 12. By successively pulsing the laser light, the DAS interrogator box 18 may record a continuous stream of sampled acoustic data along the fiber cable 12. In certain embodiments, the fiber 12 may be etched with Bragg gratings to create discrete measurement points. In other embodiments the pulse generator may be replaced by a phase, frequency, or amplitude modulator to send a coded or spread-spectrum interrogation signal down the fiber optic cable 12. As will be described below, the collected DAS VSP data may be subject to noise.

As shown in FIG. 1, the DAS interrogator box 18 may be communicatively coupled to an information handling system 20 having at least one processing component 22 and a memory component 24. The processing component 22 may be operably coupled to the memory component 24 to execute instructions for carrying out the presently disclosed techniques. These instructions may be encoded in programs that may be executed by the processing component 22 to perform the disclosed downsampling method on the DAS VSP dataset collected via the DAS interrogator 18. The codes may be stored in any suitable article of manufacture (such as the memory component 24) that includes at least one tangible non-transitory, computer-readable medium that at least collectively stores these instructions or routines. In this manner, the memory component 24 may contain a set of instructions that, when executed by the processing component 22, perform the disclosed downsampling method.

In certain embodiments, the DAS VSP data may be collected while a wellsite operator generates a known acoustic signal. For example, a vibroseis truck (not shown) at the surface of a wellbore may be used as an acoustic source to propagate seismic waves through a formation near the wellbore. By comparing the measured DAS VSP data to the known acoustic signal generated by the vibroseis truck, information about the formation may be obtained (e.g., composition, density, structure, geometry, fluid properties, density contrast between rock layers).

Repeated source data may refer to DAS VSP data collected when the wellsite operator generates the same known acoustic signal sequence across multiple iterations of data collection. As described herein, multiple sets of DAS VSP data collected at the same source location in response to the same source signal may be combined. When combining repeated source data, the data may be time-aligned relative to the initiation of the known acoustic signal in each iteration. Combining time-aligned, repeated source data may improve the signal-to-noise ratio by emphasizing measurements of the response to the known acoustic signal and deemphasizing the impact of noise.

As described herein, downsampling DAS VSP data may refer to reducing the amount of channel information. In certain embodiments, a simple downsampling approach may be used wherein a certain amount of channel data is retained and the rest is discarded. For example, a 2:1 downsampling ratio may be achieved by discarding every other data channel. In alternative embodiments, a more complex downsampling approach may be used wherein data from multiple channels is combined together to produce a single channel of output data. For example, a 4:1 downsampling ratio may be achieved by using a 7 channel running sum. The choice for a particular embodiment will be highly data dependent. As a consequence of the Nyquist sampling theorem, a simple approach of indiscriminately discarding channels might suffice for data sets with high spatial consistency, whereas the application of a low-pass filter prior to downsampling might be required for data sets with considerable channel-to-channel differences.

Figure 2:
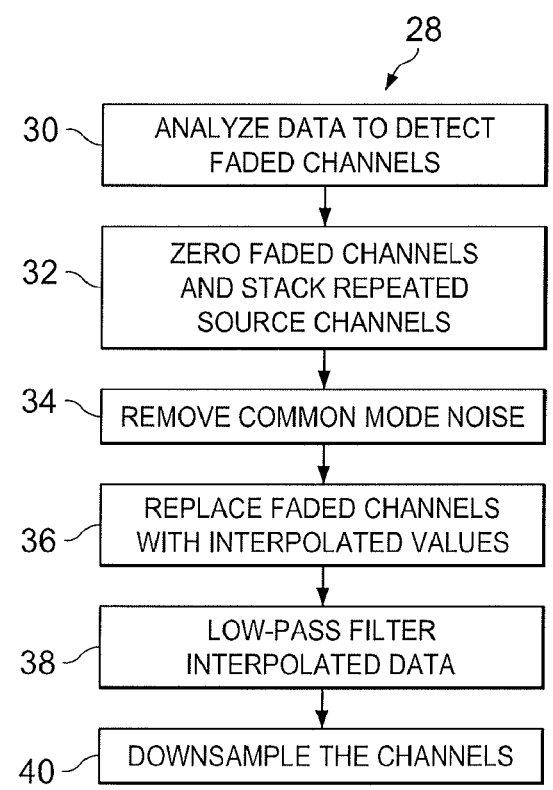
FIG. 2 is a flowchart illustrating a method for downsampling DAS VSP data, according to aspects of the present disclosure.

FIG. 2 is a flowchart illustrating a method 28 for downsampling distributed acoustic sensing data, according to aspects of the present disclosure. In the embodiment shown, the method 28 may include: analyzing data to detect faded channels (block 30), zeroing faded channels and stacking repeated source channels (block 32), removing common mode noise (block 34), replacing faded channels with modified (e.g., interpolated) values (block 36), low-pass filtering interpolated data (block 38), and downsampling the channels (block 40).

At block 30, the measured DAS VSP data may be analyzed to detect corrupted channels. Channel corruption may result from noise caused by various sources, such as external sources (e.g., environmental disruptions, surface acoustic waves, nearby drilling), time-varying noise sources within a fiber (e.g., polarization fading or Rayleigh fading), and an increased noise near the cable termination.

Such corrupted data channels may be detected (block 30) using one or more of a variety of noise-sensing methods. In certain embodiments, those methods may include simple thresholding to identify channels with very high amplitudes, identifying channels with large levels of high amplitude energy, and/or performing a spectrogram (time-frequency) analysis to detect anomalous amounts of energy outside the expected pass band of the source used. In other embodiments, fading detection (block 30) may be performed in the in-phase/quadrature (I/Q) modulation domain by evaluating the radius of the corresponding I/Q circle.

Regardless of the technique used to identify faded channels, a (possibly time-varying) quality factor for each channel may be estimated based on statistics derived from the noise-sensing methods. For example, the quality factor (q) may be calculated in the time-frequency domain over a pre-determined set of frequencies. This pre-determined set of frequencies may be chosen outside of the frequency support of the seismic system. Another approach for calculating q is to split the time series of each channel into windows of equal length and calculate the reciprocal variance over each time patch. This approach generally assumes that the noise statistics follow a Gaussian distribution (white noise) and that the seismic signal does not change over adjacent traces. In another embodiments, the quality factor (q) may be determined in reference to the optical energy of the backscattered light given by $I^2+Q^2$, where I and Q are the quadrature and in-phase components of the optical backscattered signal, respectively. Note that in certain embodiments a time-invariant quality factor may be used whereas in other embodiments the employed quality factor may change over time.

Figure 3:
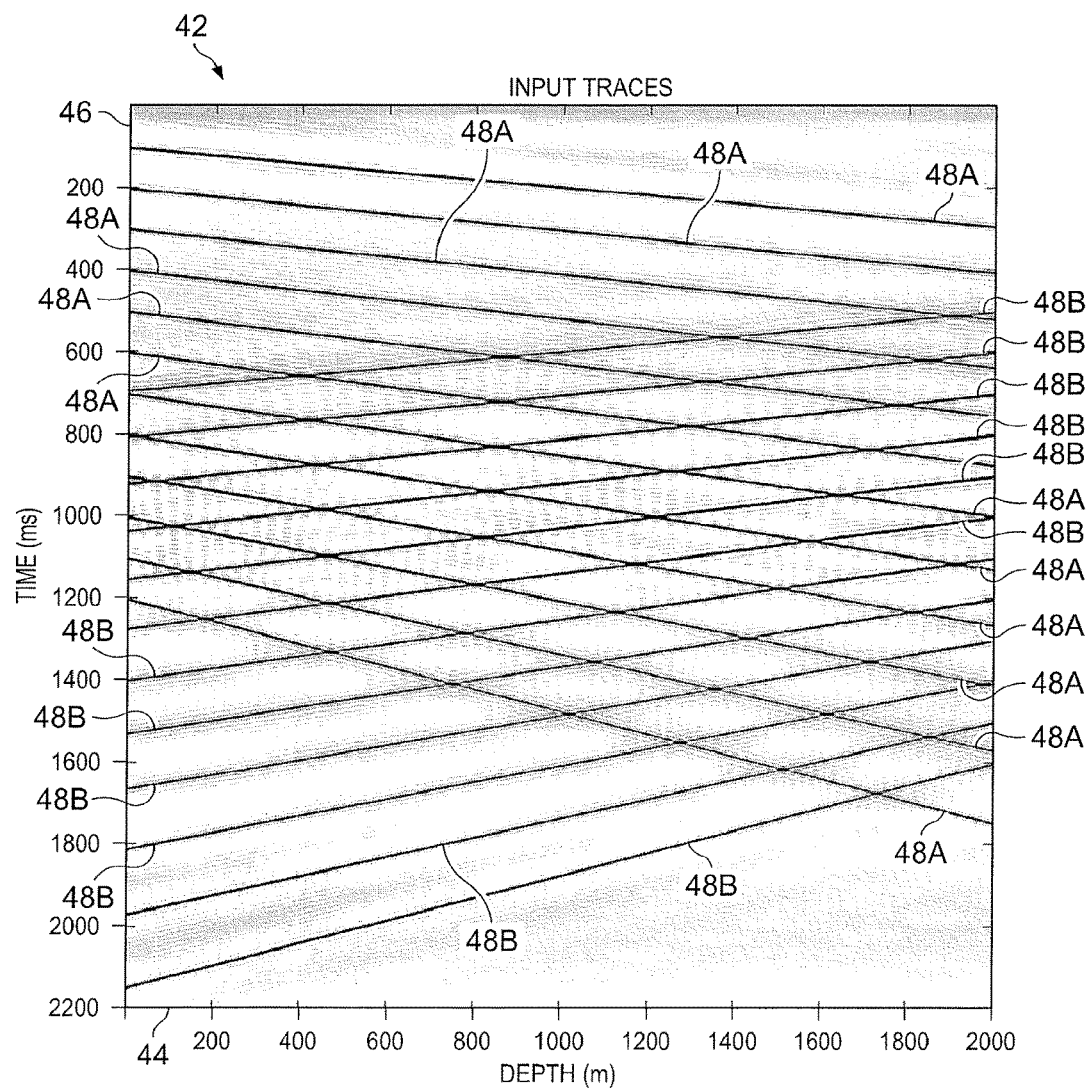
FIG. 3 illustrates simulated, noise-free DAS VSP data, according to aspects of the present disclosure.

FIG. 3 is a plot 42 illustrating simulated, noise-free DAS VSP data, according to aspects of the present disclosure. The plot 42 shows data taken in the time-space domain, specifically at different depths 44 of the well over time 46. As shown, FIG. 3 depicts data from 2000 channels, which may be spaced every 1 meter, and captured over 2200 milliseconds. The data depicts 12 events 48A dipping down to the right at 12 different velocities, which indicates measurements of 12 seismic waves traveling in the downhole direction. The data also depicts another 12 events 48B dipping down and to the left at 12 different velocities, which indicates measurements of 12 seismic waves traveling in the uphole direction. The systems and methods (e.g., method 28) described herein may be used to downsample the DAS VSP data in a way that enables more accurate detection of such events 48, compared to conventional downsampling techniques.

Figure 4:
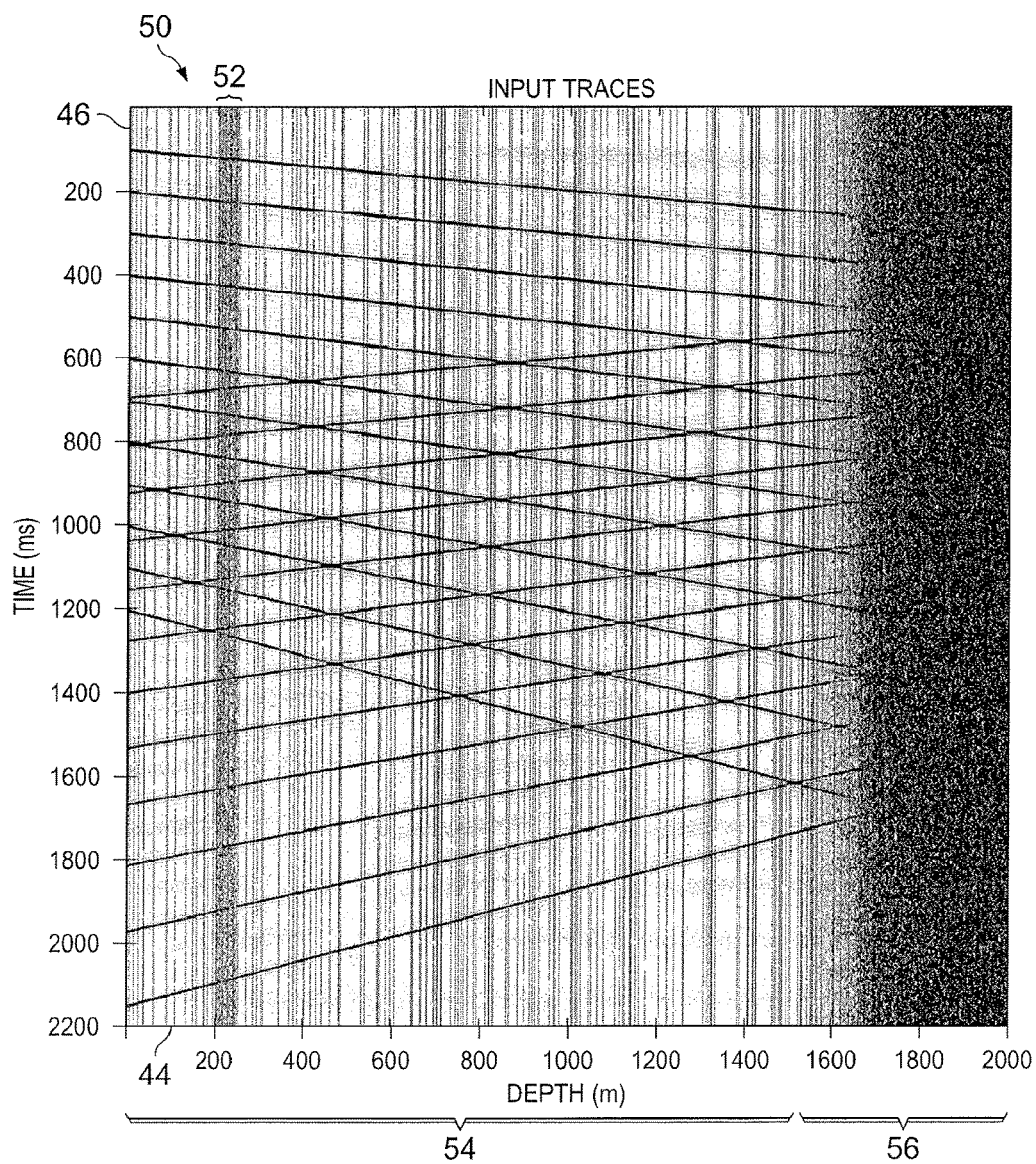
FIG. 4 illustrates simulated, noisy DAS VSP data, according to aspects of the present disclosure.

FIG. 4 is a plot 50 illustrating simulated, noisy DAS VSP data, according to aspects of the present disclosure. The data in FIG. 4 is substantially identical to the data in FIG. 3, except that corrupted channels have been simulated by adding noise to the data. For example, channels ranging from approximately 200 to 250 meters in depth (e.g., section 52) show the impact of external noise sources hitting the fiber-optic cable close to the wellbore. Intermittent faded channels from measurements between 0 and approximately 1580 meters in depth (e.g., section 54) may reflect channel fading such as polarization fading and/or Rayleigh fading. The increased number of corrupted channels from measurements beyond approximately 1580 meters in depth (e.g., section 56) may reflect corrupted channels from cable termination noise.

Turning back to FIG. 2, at block 32 corrupted channels may be zeroed and repeated source channels may be stacked, according to aspects of the present disclosure. In some embodiments, the corrupted data channels identified in block 30 may be removed from the dataset by setting the value of each sample trace of those channels to zero. In embodiments where a quality factor is estimated for each channel, that quality factor may be used to determine whether a channel should be zeroed out (e.g., by zeroing all channels below a certain threshold quality factor).

In embodiments where repeated source data has been measured, the DAS VSP data from multiple iterations may optionally be time-aligned and stacked to produce a composite dataset for each channel. In certain embodiments, the stacked data for each repeated channel may be produced by taking the mean, median, or combination of mean and median for the repeated channel across multiple iterations. Data from faded or zeroed channels may be disregarded during creation of the stacked data. In other embodiments, the quality factor for each repeated channel may be used to weight the contribution of that repeated data channel to the stacked channel. This process is referred to as weighted stacking. Data from channels estimated to have a high quality factor may be given more weight than channels estimated to have a low quality factor. In this way, the weighted stacked DAS VSP data from repeated sources may achieve a better signal-to-noise ratio than data from a single iteration.

Figure 5:
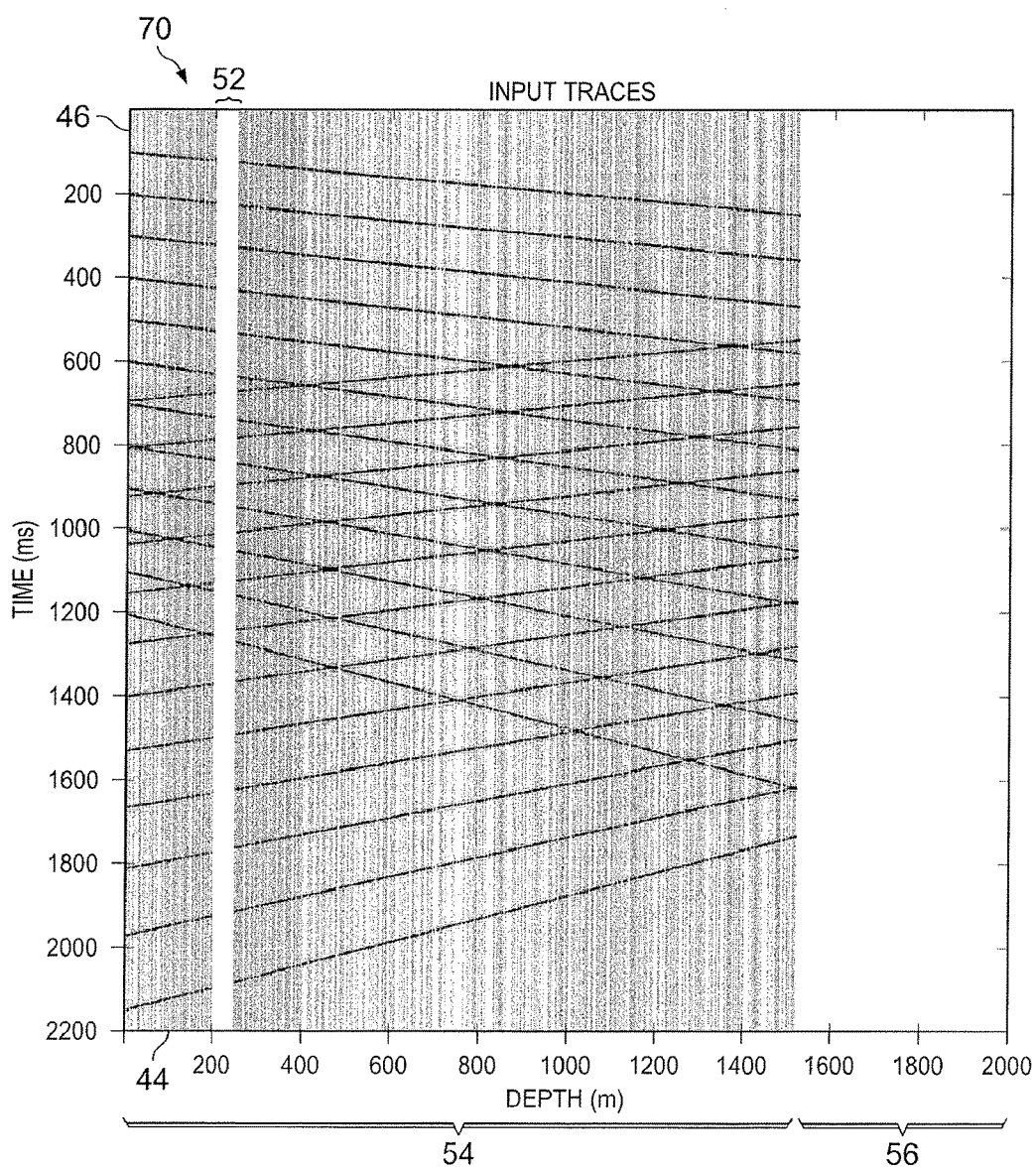
FIG. 5 illustrates simulated DAS VSP data with faded channels zeroed out, according to aspects of the present disclosure.

FIG. 5 is a plot 70 illustrating simulated DAS VSP data with corrupted channels zeroed out, according to aspects of the present disclosure. The data in FIG. 5 substantially resembles the data in FIG. 3, except that the corrupted channels identified in block 32 of FIG. 2 have been zeroed. The data in FIG. 5 may include a single iteration of measurement or a composite formed by stacking repeated measurements. In FIG. 5, cable termination noise has resulted in the zeroing of all channels for depths beyond approximately 1580 meters (e.g., section 56). In addition, external noise hitting the fiber optic cable at section 52 has resulted in the zeroing of all channels between approximately 200 and 250 meters.

Turning again back to FIG. 2, at block 34, common mode noise may be removed from the DAS VSP data, according to aspects of the present disclosure. Common mode noise may refer to noise that, instead of causing fading in a single channel or a handful of channels, affects a significant number of data channels simultaneously over a period of time. Common mode noise may result from, for example, interference at the DAS interrogator box that affects reception of DAS data from all channels. In embodiments with stacked data of multiple iterations, the common mode noise may be removed from the composite DAS VSP data (which may be stacked as described with respect to block 32 above). In embodiments without stacked data, or where the data acquired from multiple iterations is not stacked, the common mode noise may be removed from a single set of data.

In some embodiments, common mode noise may be removed (block 34) by combining data from all channels that have not been identified as having faded, based on the analysis of block 30. That combined data (referred to as a pilot trace), which may be created from the mean, median, or combination of mean and median of the non-faded channels, may be an appropriate estimate of the common mode noise. The estimated common mode noise may be removed by subtracting the pilot trace from the original data set.

At block 36, interpolation may be used to replace corrupted channels with modified values. The interpolation is performed based on the non-corrupted channels, according to aspects of the present disclosure. Interpolation of data may be achieved using a variety of methods, such as simple linear interpolation, sync interpolation, spline interpolation, f-x domain deconvolution, cubic interpolation, bi-cubic interpolation, and/or image inpainting. The selection among known methods may vary based, in part, on the number and location of faded channels (identified at block 30). Where relatively small numbers of faded channels are present and/or there are relatively many non-faded channels between them, a simple linear interpolation may be acceptable. This may be the case, for example, in the faded channels identified across the section 54 of FIG. 5. Where the number of faded channels is relatively large and/or there are relatively long runs of consecutive faded channels (e.g., in section 52), more computationally expensive interpolation methods (e.g., image inpainting) may be desirable.

The goal of interpolation is to minimize the effect of the faded channels on the subsequent processing steps and to provide a high spatial consistency between adjacent channels. Without interpolation, the later downsampling operations may suffer from significant aliasing effects due to spatial inconsistency between adjacent valid channels and zeroed channels.

Figure 6:
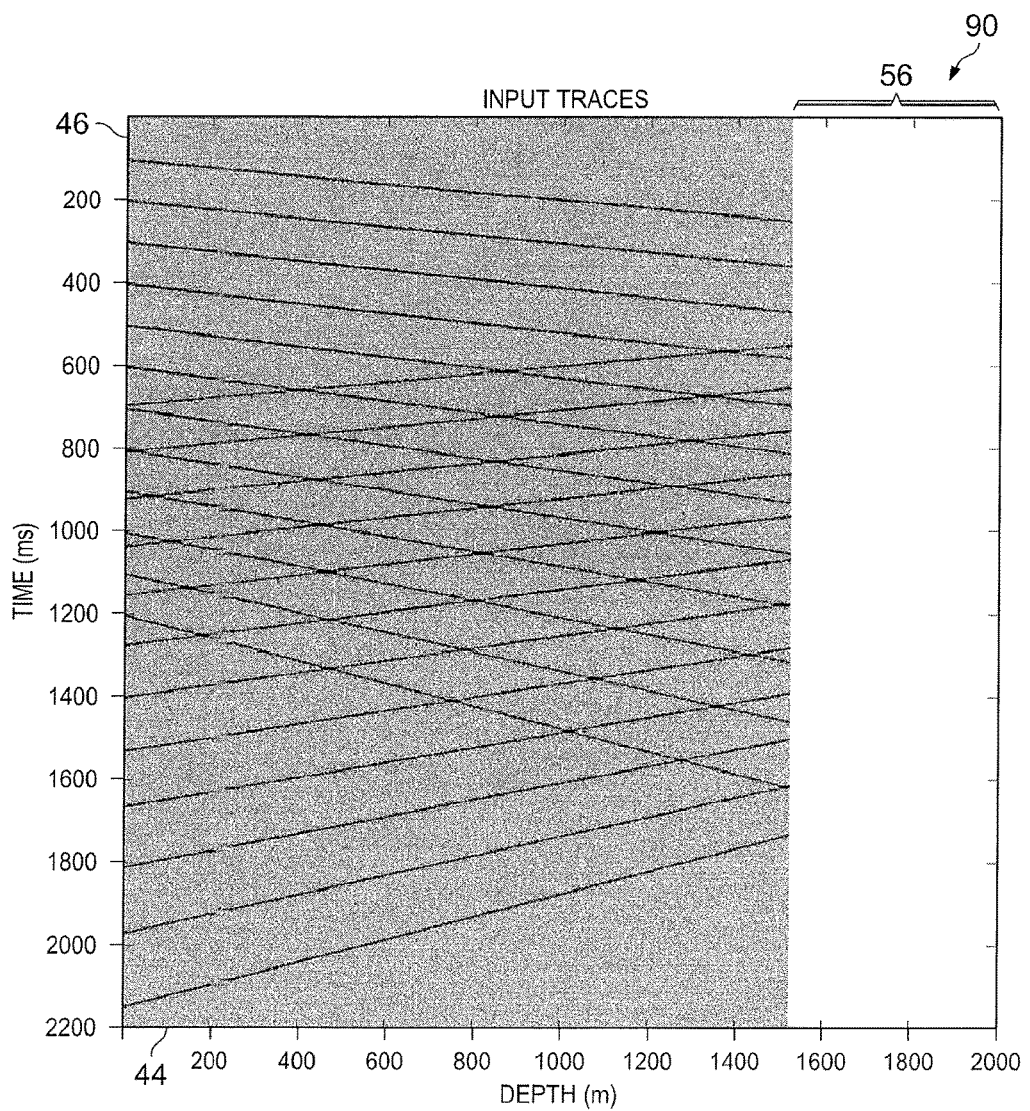
FIG. 6 illustrates simulated DAS VSP data with interpolation of faded channels, according to aspects of the present disclosure.

FIG. 6 is a plot 90 illustrating simulated DAS VSP data after interpolation of corrupted channels, according to aspects of the present disclosure. The data in FIG. 6 is substantially identical to the data in FIG. 5, except that many of the zeroed channels (e.g., in sections 52 and 54 of FIG. 5) have been replaced with interpolated data. Interpolation has not been used in the zeroed out channels below approximately 1580 meters of depth (e.g., section 56), which correspond to the channels affected by cable termination noise.

Turning back to FIG. 2, at block 38, the interpolated data may be low-pass filtered, according to aspects of the present disclosure. In some embodiments, the filtering may be performed by polygon (or fan) filtering of the data in the frequency-wavenumber (f-k) domain. To accomplish filtering in the f-k domain, the data may be transformed using a two-dimensional discrete Fourier transform (DFT). In the f-k domain, polygons may be formed to describe the filter areas. The size and position of the polygons may be selected based on either or both of at least two conditions: first, the desired downsampled channel spacing, and second, the minimum velocity of events expected in the data. For either or both conditions, aliasing effects may be avoided in the downsampled data by satisfying the Nyquist sampling theorem.

Satisfying the first condition (desired downsampled channel spacing) may involve eliminating all energy in the data above the Nyquist wavenumber of the desired downsampled data. For example, if the desired downsampled channel spacing is 4 meters, the Nyquist wavenumber may be defined as $$k_{Nyquist} = \frac{1}{(2*\text{spacing})} = \frac{1}{(2*4)} = \frac{1}{8}$$

cycles per meter. Accordingly, the polygon (or fan) filter may be selected to eliminate all wavenumbers in the dataset above ⅛ cycles per meter and below −⅛ cycles per meter. Satisfying the second condition (minimum velocity of events expected in the data) may involve eliminating all values in the f-k domain that represent waves traveling slower than the expected slowest velocity in the data. According to the second condition, all values below the lines given by $f=c_{min}*k$ and $f=-c_{min}*k$ may be eliminated, where f is the frequency, $c_{min}$ is the expected slowest velocity of the events that should be preserved, and k is the wavenumber.

In certain embodiments, the polygon filtering may be applied with either one or both conditions. Additionally, the filtering may be applied to all channels simultaneously or on sequential subsets of channels (e.g., 64 channels at a time). After the filter is applied in the f-k domain, the data may be inverse transformed using a two dimensional inverse DFT back to the time and space domain.

In other embodiments, the filtering may be performed by applying a k (wavenumber) low-pass filter to the data in k-space (i.e., a time-wavenumber (t-k) domain). To accomplish filtering in k-space, the data may be transformed using a one dimensional DFT over the spatial domain. In k-space, one or more wavenumber bounds may be selected to filter the data. The location of the k low-pass filter may be selected based on, for example, the first condition of the Nyquist sampling theorem (i.e., desired downsampled channel spacing) described above. The k low-pass filter may be applied to all channels simultaneously or on sequential subsets of channels (e.g., 64 channels at a time). After the filter is applied in k-space, the data may be inverse transformed using a one-dimensional inverse DFT back to the space domain.

Figure 7:
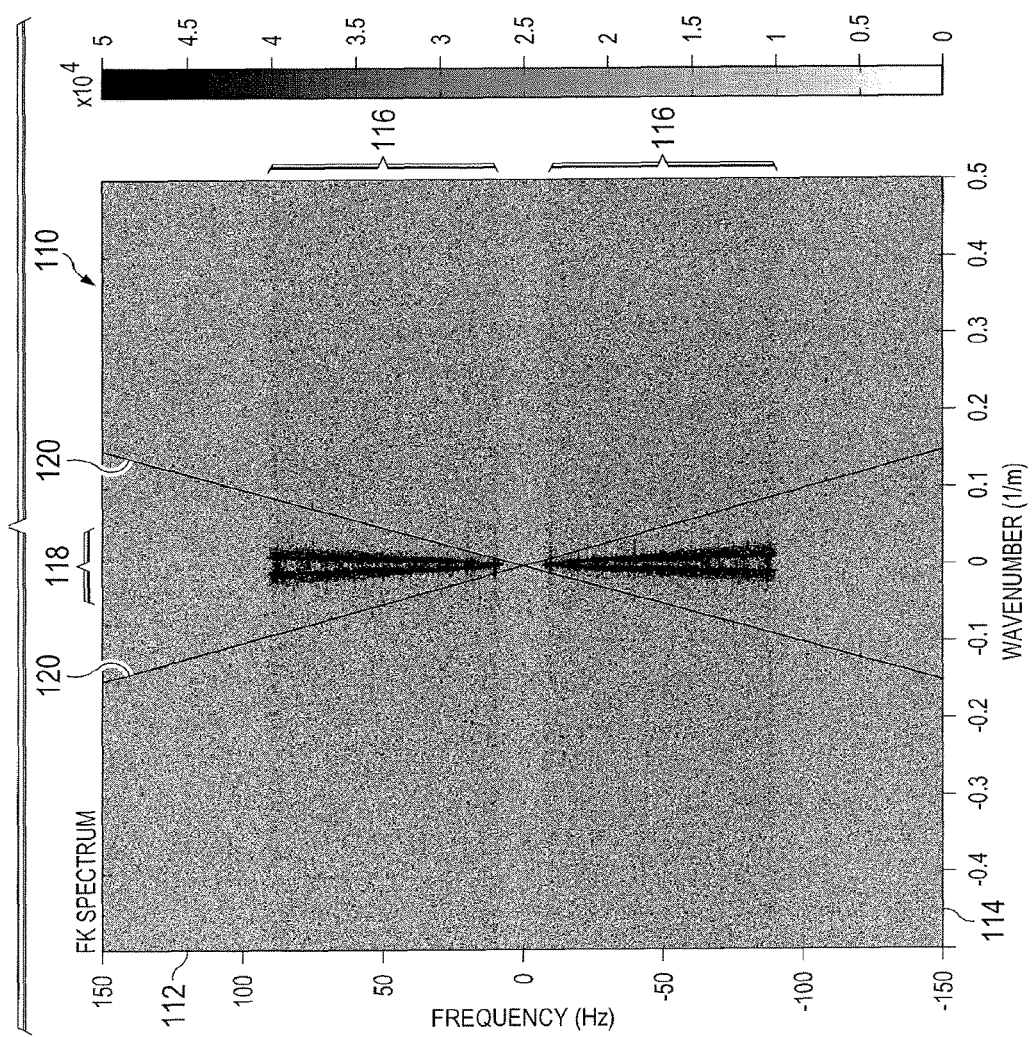
FIG. 7 illustrates simulated DAS VSP data in the frequency-wavenumber (f-k) domain, according to aspects of the present disclosure.

FIG. 7 is a plot 110 illustrating simulated DAS VSP data in the f-k domain, according to aspects of the present disclosure. That is, the data is plotted as energy values that vary with frequency 112 (in Hz) and wavenumber 114 (in 1/m) of the channel readings. In FIG. 7, the data is an f-k transformation of the data shown in FIG. 6 (i.e., previously interpolated dataset). As illustrated, the data contains valid data (i.e., higher energy levels) in the 9 to 90 HZ frequency range (e.g., section 116), and the negative frequency values mirror the positive frequency values. Although all wavenumbers are shown as represented in the spectrum from −0.5 to 0.5 cycles per meter, most of the energy is concentrated near wavenumbers (k)<0.05 cycles per meter (e.g., section 118). Lines 120 have been added to the data showing the trajectory of a wave travelling at 1000 meters per second.

Figure 8:
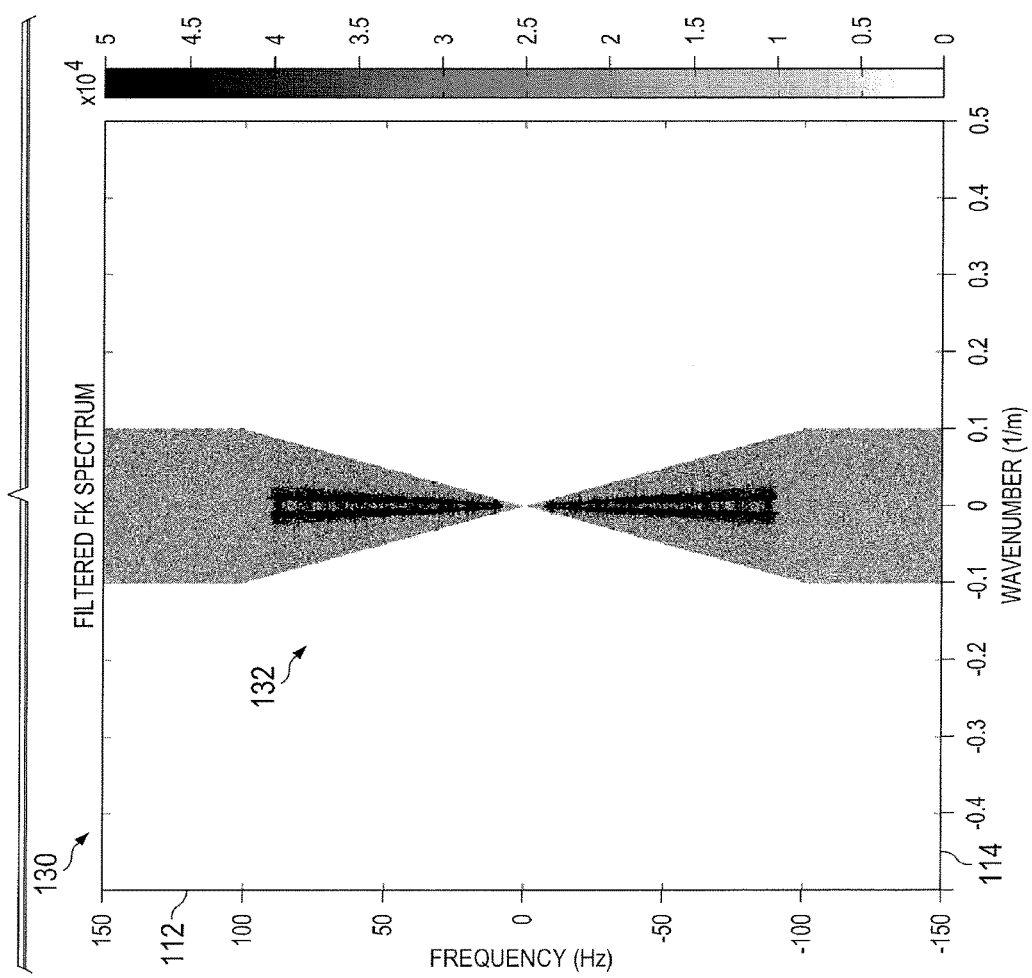
FIG. 8 illustrates a fan-filter applied to simulated DAS VSP data in the f-k domain, according to aspects of the present disclosure.

FIG. 8 is a plot 130 illustrating a fan-filter 132 applied to the simulated DAS VSP data in the f-k domain, according to aspects of the present disclosure. Specifically, FIG. 8 shows a polygon (fan) filtered version of the data in FIG. 7. In the embodiment of FIG. 8, the desired downsampling resolution may be, for instance, 5 meters, resulting in a Nyquist wavenumber of 1/10 cycles per meter. Constrained by the first condition, all wavenumbers greater than 0.1 and less than −0.1 have been eliminated. Additionally in this embodiment, from the known physical constants of most rocks, it may be conversely estimated that the data will not record any valid events slower than about 1000 meters per second (by comparison sound velocity in water is 1500 meters per second). According to the second condition, all energy propagating slower than 1000 meters per second has been eliminated.

In other embodiments the filtering at block 38 may be performed employing an off-the-shelf convolutional low-pass filter in the time-domain satisfying the Nyquist sampling theorem (cut-off frequency of low-pass filter is 1/(2*M) cycles per meter with M being the desired downsampling factor). Such off-the-shelf low-pass filters assume the noise statistics of adjacent channels to be stationary and of equal magnitude. However, these conditions are not usually met when using DAS for VSP. This is mainly due to the way the seismic signal is interrogated in the DAS box. For example, the DAS interrogator measures the dynamic strain caused by seismic waves impinging on the fiber using a coherent, narrow-bandwidth interrogation light signal. Due to the intrinsic Rayleigh backscatter of the optical fiber, a portion of the injected light signal may be constantly back-reflected and captured in the interrogator. Due to the randomness of the Rayleigh backscattering effect, the optical energy of the back-reflected signal may vary greatly over time. This is reflected in the noise floor of the DAS data stream, which tends to deteriorate whenever the optical power of the back-reflected signal decreases. As a result, the noise floor of adjacent channels may vary randomly.

To account for the varying noise floors of adjacent channels, it may be desirable to weight the interpolated dataset that will be filtered (block 38). For example, at block 38 of FIG. 2, the method may involve weighting each channel and applying the f-k (or k) transform, applying the desired filter in the f-k (or t-k) domain to the weighted dataset, and applying the inverse f-k (or k) transform, and removing the applied weights to arrive at the filtered dataset. Weighting the channels prior to applying the filter may help to reduce the undesirable effects of any channels still contaminated by high amplitude noise. These spikes in the data might otherwise lead to an undesirable broadband piece of noise when transformed under the one- or two-dimensional DFT.

Figure 9:
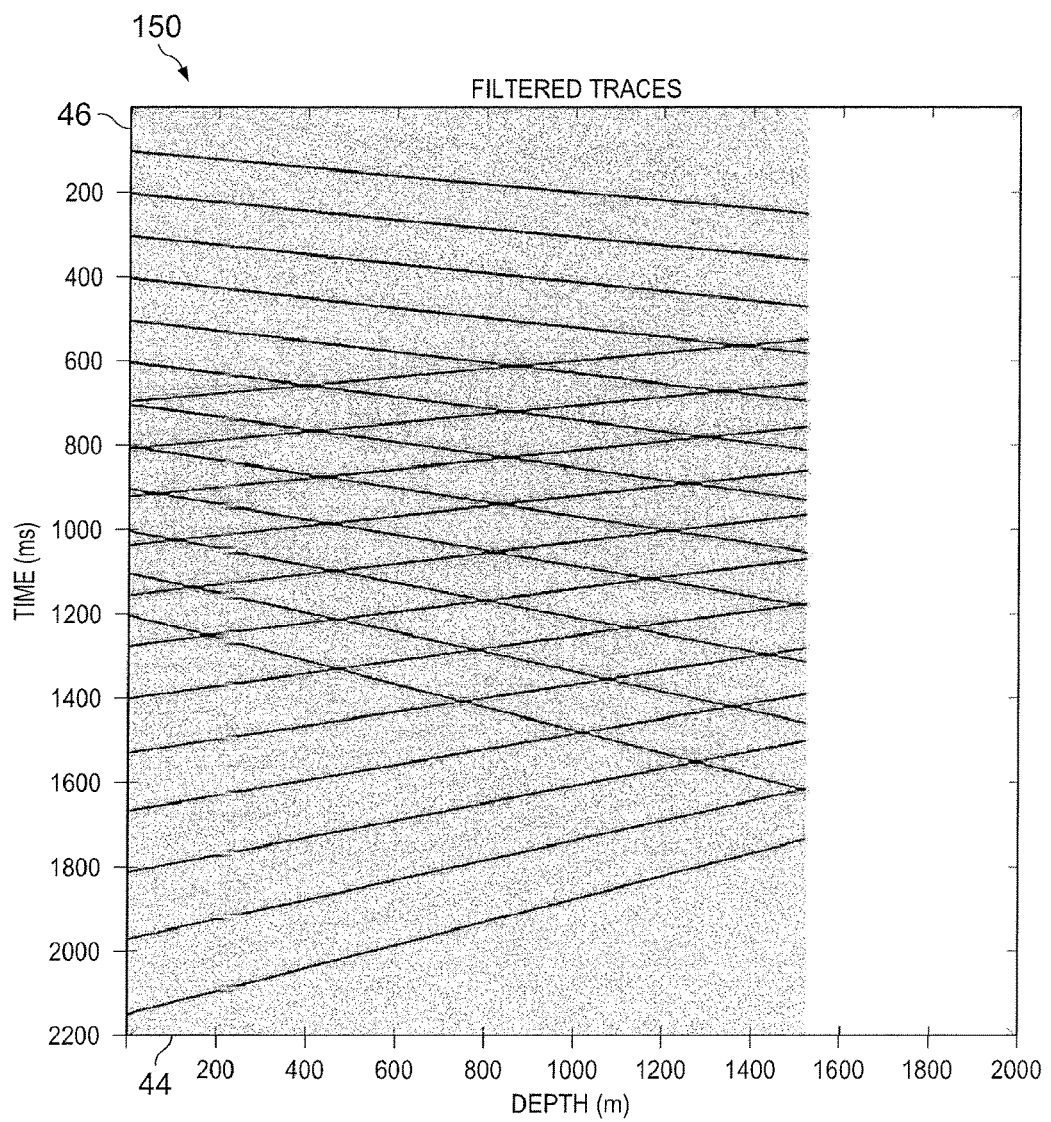
FIG. 9 illustrates filtered simulated DAS VSP data in the time-space domain, according to aspects of the present disclosure.

In some embodiments, the channels may be weighted by a quality factor (q). This may be the same quality factor (q) described above with reference to determining whether to zero the faded channels and/or how to weight the stacked channels (block 32). In other embodiments, the channels may be weighted by normalizing the data in each channel over a peak value of that particular channel taken in some time window. When normalizing the data over such peak values, the amplitudes of the individual channels may no longer be varied. Therefore, once the filter has been applied (block 38) in the f-k domain or k-space, it is desirable to unweight (i.e., remove the applied weights from) the resulting time-space data for each channel, so that the data still preserves geophysically meaningful amplitudes of acoustic events. FIG. 9 is a plot 150 illustrating filtered simulated DAS VSP data in the time-space domain, according to aspects of the present disclosure. Specifically, FIG. 9 shows the inverse f-k transform of the polygon filtered data in FIG. 8. According to the downsampling resolution applied to create the filter, all energy that would lead to aliasing when applying a 5:1 channel decimation has been removed.

Figure 10:
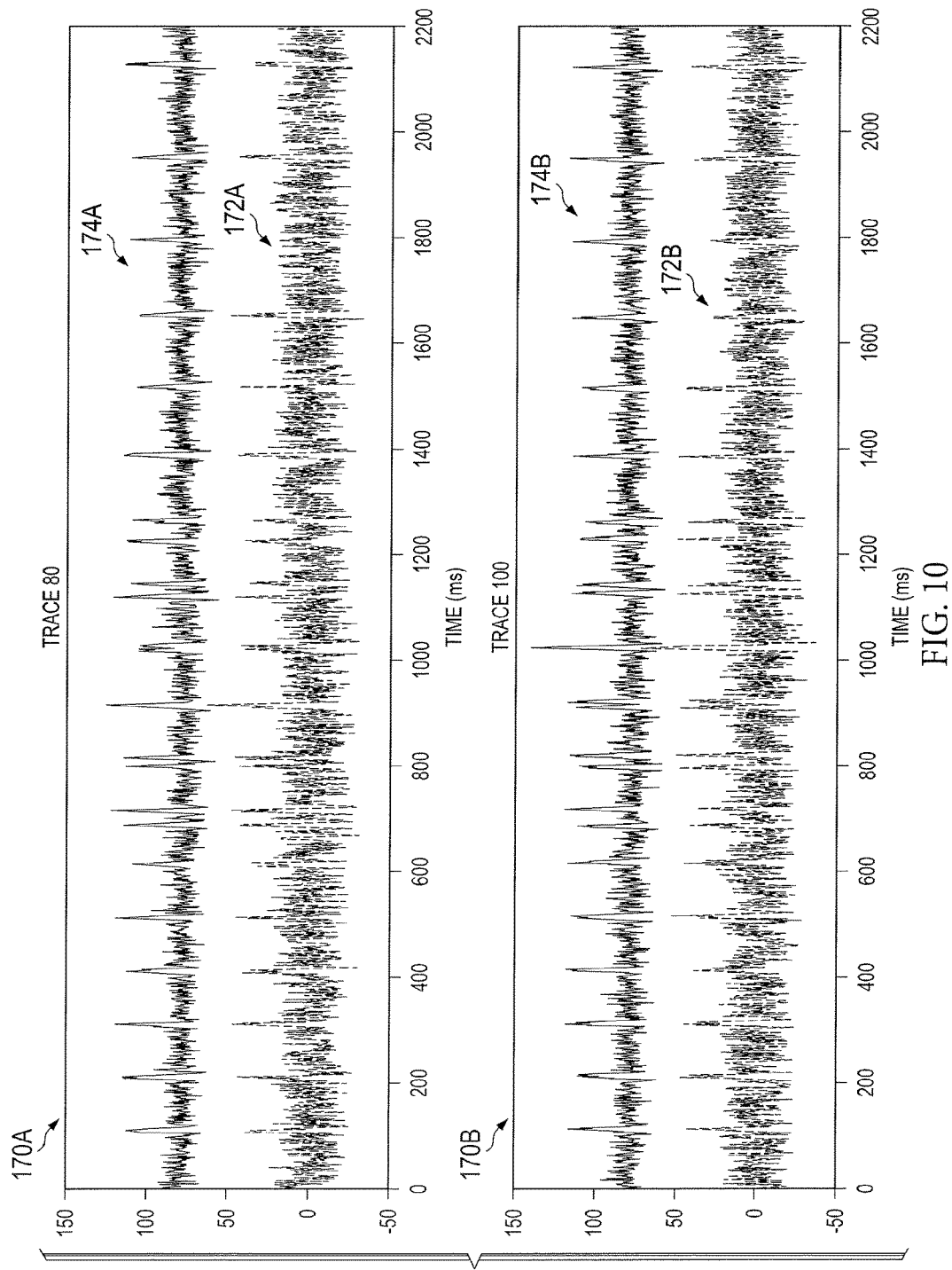
FIG. 10 illustrates the effect of a zeroing, interpolating, and filtering process on two channels of simulated DAS VSP data, according to aspects of the present disclosure.

FIG. 10 illustrates the effect of the zeroing, interpolating, and filtering process on two channels of simulated DAS VSP data, according to aspects of the present disclosure. Specifically, FIG. 10 shows a plot 170A of data from channel 80 and a plot 170B of data from channel 100. A lower waveform 172 in each plot 170 shows the original data in that channel taken from FIG. 3 over time. An upper waveform 174 in each plot 170 shows the corresponding filtered version of data taken from FIG. 9 over time. As illustrated in FIG. 10, the overall background noise has been suppressed while keeping the quality of the event measurements. That is, in both plots 170, the upper waveforms 174 have less noise than the corresponding lower waveforms 172, while still indicating the same events in the data.

Again turning to FIG. 2, at block 40, the filtered data may be downsampled, according to aspects of the present disclosure. The downsampling of block 40 may occur using a variety of techniques, including directly discarding unwanted channels, taking the mean or median of neighboring channels, using a running sum, or any other downsampling technique known to those of skill in the art.

Figure 11:
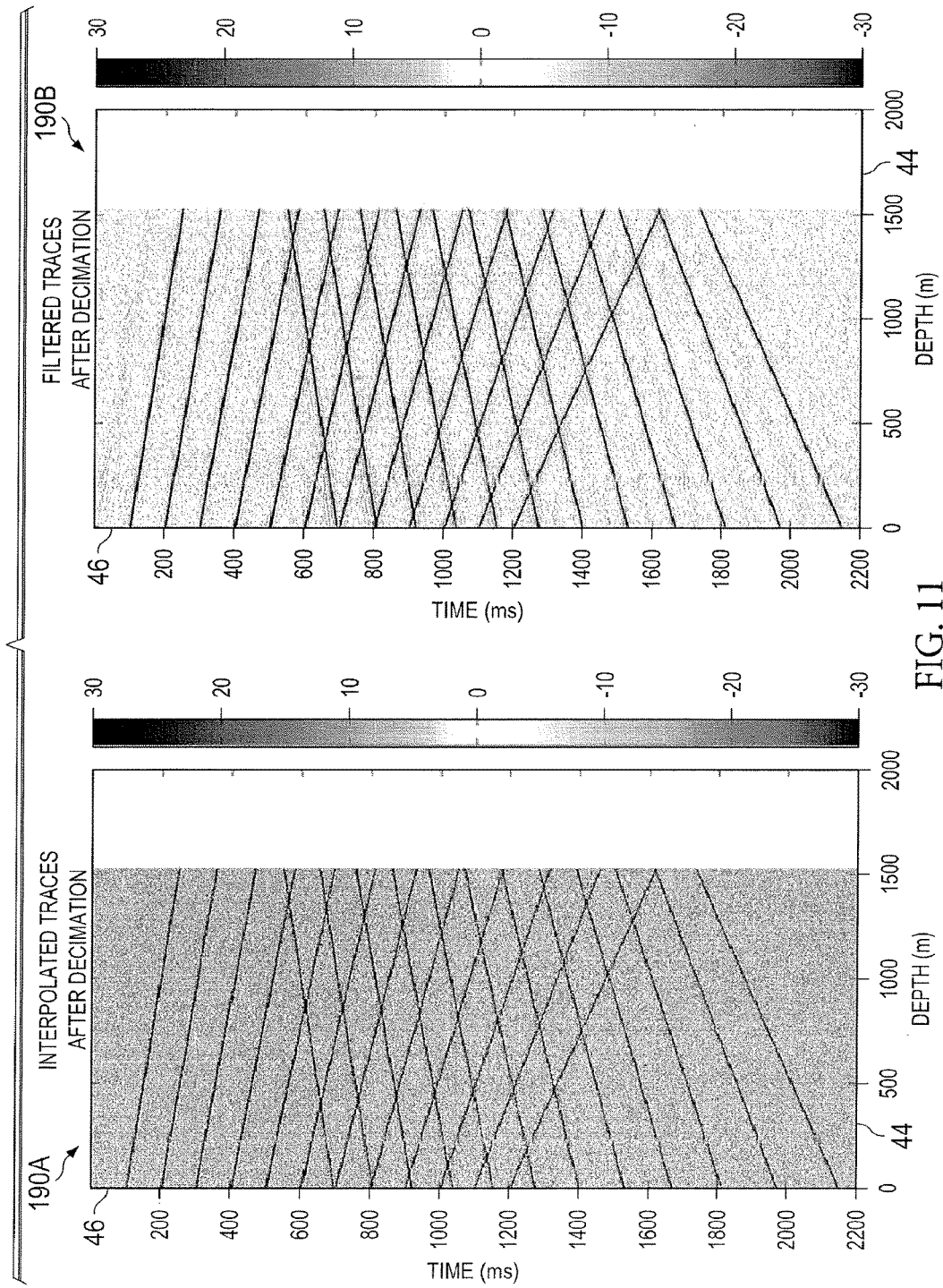
FIG. 11 illustrates the results of downsampling simulated VSP data, according to aspects of the present disclosure.

FIG. 11 illustrates the results of downsampling simulated VSP data, according to the aspects of the present disclosure. Specifically, a first plot 190A depicts the simple downsampling of the interpolated data provided in FIG. 6 by discarding the unwanted channels. A second plot 190B shows the results of downsampling the f-k polygon filtered data of FIG. 9 using, for example, a 7-channel running sum. As shown by these plots 190, downsampling the f-k polygon filtered data provides an improved signal-to-noise ratio as compared to downsampling just the interpolated data.

FIG. 12 illustrates the effect of the zeroing, interpolating, filtering, and downsampling process on two channels of simulated DAS VSP data, according to aspects of the present disclosure. Similar to FIG. 10, FIG. 12 shows a plot 210A of data from channel 80 and a plot 210B of data from channel 100. A lower waveform 212 in each plot 210 shows the original (unfiltered) data in that channel taken over time. An upper waveform 214 in each plot 210 shows the corresponding f-k polygon filtered and downsampled (e.g., via 7-channel running-sum) version of data taken from plot 190B of FIG. 11 over time. As before, in both plots 210 the upper waveforms 214 have less noise than the corresponding lower waveforms 212, while still indicating the same events in the data. In addition, the results illustrated in FIG. 12 are shown to have improved over the results of FIG. 10, where only the f-k polygon filter was applied (without downsampling) to generate the upper waveforms 174. Thus, filtering and downsampling the interpolated channel data may provide a higher signal to noise ratio and, therefore, more accurate interpretation of acoustic events in the DAS VSP data.

In some embodiments, it may be desirable to combine certain steps of the method 28 into a single processing step. For example, the filtering (block 38) and downsampling (block 40) of the data may be combined into a single step. A downsampling scheme using a convolutional filter may be applied to the data using Equation 1 below. In this equation, h represents a low-pass filter of order K. This low-pass filter has a cutoff frequency of less than 1/M times the Nyquist frequency, where M is the spatial downsampling factor (e.g., M=2 would imply that every other channel is discarded). Thus, the filter h may be selected based on the desired downsampled channel spacing, as described above. As provided in Equation 1, the filter h may be a finite impulse response (FIR) filter. However, in other embodiments, the filter h may be an infinite impulse response filter. Equation 1 provides a calculation that may be performed by a decimating FIR filter for the nth output (i.e., filtered and downsampled) trace at a time instant t.

$$y(n, t) = \sum_{k=0}^{K-1} x(m, t) \cdot h(k) \text{ where } m = nM - k \qquad (1)$$

In equation 1, x( ) represents the input traces to be downsampled. This decimation scheme, however, assumes that the quality of each input trace is homogeneous. As described above, the DAS VSP data may feature a noise floor that varies greatly between adjacent channels. It may be desirable to account for this variation prior to the application of downsampling schemes employing convolutional filtering. In order to adapt Equation 1 for channels with non-stationary noise floor statistics, the following scheme may be used.

$$y(n, t) \frac{1}{\sum_{k=0}^{K-1} q(m, t)} \sum_{k=0}^{K-1} q(m, t) x(m, t) \cdot h(k) \qquad (2)$$

In Equation 2, q(m, t) may represent a weighting factor reflecting the quality (q) of the mth trace at a time instant t. As shown in Equation 2, the weights may be applied during the filtering process, and then removed from the data by the factor $$\frac{1}{\sum_{k=0}^{K-1} q(m, t)}.$$

the weighting process may preserve the original amplitude level of the data while minimizing the channel-to-channel inconsistency during the filtering process.

It should be noted that the downsampling scheme of Equation 2 may be employed at any stage of the overall DAS VSP processing flow. For example, the weighted, filtered, downsampling scheme may be applied before or after stacking (block 32), before or after noise removal (block 34), and before or after correlation with a reference sweep signal. In some embodiments, it may be desirable to apply the weighted, filtered, downsampling scheme of Equation 2 to the dataset after employing a weighted stacking scheme (block 32) but before correlating the stacked, downsampled dataset with a reference sweep signal.

It should be noted that the weighting scheme of Equation 2 is designed such that it conserves the energy of all channels involved in a single down sampling step. However, in the presence of channel fading, this downsampling might cause unreasonable amplitude values of the downsampled traces. This is because of the nature of the faded channels, which tend to contain highly oscillating signals with an overall energy that is higher than the energy of non-faded channels. It is therefore desirable to identify and remove the faded channels (blocks 30 and 32) prior to applying the weighted, filtered, downsampling scheme of Equation 2.

Embodiments disclosed herein include:

A. A method including analyzing a collected dataset, wherein the collected dataset includes a plurality of data channels. The method also includes identifying among the plurality of data channels at least one corrupted data channel, replacing the at least one corrupted data channel from the collected dataset with at least one interpolated data channel to generate an interpolated dataset, applying a filter to the interpolated dataset to generate a filtered dataset, and downsampling the filtered dataset.

B. A tangible, non-transitory, computer-readable medium including machine-readable instructions to: analyze a collected dataset having a plurality of data channels, identify among the plurality of data channels at least one corrupted data channel, replace the at least one corrupted data channel from the collected dataset with at least one interpolated data channel to generate an interpolated dataset, apply a filter to the interpolated dataset to generate a filtered dataset, and downsample the filtered dataset.

C. A system including a distributed acoustic sensing (DAS) interrogator box, a processing component communicatively coupled to the DAS interrogator box, and a memory component. The memory component contains a set of instructions that, when executed by the processing component, cause the processing component to analyze a collected dataset received from the DAS interrogator box, wherein the collected dataset includes a plurality of data channels. When executed by the processing component, the set of instructions also cause the processing component to identify among the plurality of data channels at least one corrupted data channel, replace the at least one corrupted data channel from the collected dataset with at least one interpolated data channel to generate an interpolated dataset, apply a filter to the interpolated dataset to generate a filtered dataset, and downsample the filtered dataset.

Each of the embodiments A, B, and C may have one or more of the following additional elements in combination: Element 1: further including zeroing data in the at least one corrupted data channel. Element 2: further including: analyzing a second collected dataset, wherein the second collected dataset includes a plurality of data channels; and stacking at least one of the plurality of data channels of the collected dataset with at least one of the plurality of data channels of the second collected dataset. Element 3: further including: determining a quality factor for at least one of the plurality of data channels of the collected dataset and the second collected dataset; and weighting the at least one of the data channels of the collected dataset and the second collected dataset for stacking based on the quality factor. Element 4: further including removing a common mode noise from the collected dataset. Element 5: further including determining the common mode noise by summing together data from all of the plurality of data channel that are not determined to be corrupted, and subtracting the common mode noise from the collected dataset. Element 6: further including determining the at least one interpolated data channel by applying an interpolation scheme selected from the group consisting of: simple linear interpolation, sync interpolation, spline interpolation, f-x domain deconvolution, cubic interpolation, bi-cubic interpolation, image inpainting, and a combination thereof. Element 7: further including selecting an interpolation scheme based on a number of identified corrupted data channels and a location of the at least one corrupted data channel. Element 8: wherein applying the filter includes applying a wavenumber (k) low-pass filter to the interpolated dataset in a time-wavenumber (t-k) domain. Element 9: wherein applying the filter includes applying a polygon filter to the interpolated dataset in a frequency-wavenumber (f-k) domain. Element 10: further including selecting the polygon filter to apply to the interpolated dataset based on a desired downsampled channel spacing, a minimum velocity of events expected in the collected dataset, or both. Element 11: further including: applying a weight to each data channel of the interpolated dataset; transforming the weighted, interpolated dataset into a time-wavenumber (t-k) domain or a frequency-wavenumber (f-k) domain using a Fourier transform; applying the filter in the t-k domain or f-k domain; transforming the filtered data into a time-space domain; and unweighting the filtered data to generate the filtered dataset. Element 12: herein downsampling the filtered dataset includes dropping channel data, taking a mean or median of neighboring channels, or using a running sum. Element 13: further including acquiring data via a distributed acoustic sensing (DAS) system by measuring backscatter from a pulse of light sent along a fiber optic cable to generate the collected dataset.

Element 14: further including machine-readable instructions to zero data in the at least one corrupted data channel. Element 15: further including machine-readable instructions to: analyze a second collected dataset, wherein the second collected dataset includes a plurality of data channels; and stack at least one of the plurality of data channels of the collected dataset with at least one of the plurality of data channels of the second collected dataset. Element 16: further including machine-readable instructions to remove a common mode noise from the collected dataset. Element 17: further including machine-readable instructions to apply the filter to the interpolated dataset in a time-wavenumber (t-k) domain or a frequency-wavenumber (f-k) domain to generate the filtered dataset.

Element 18: further including a fiber optic cable coupled to the DAS interrogator box, wherein the fiber optic cable is at least partially disposed in a wellbore for collecting vertical seismic profile (VSP) measurements, and wherein the at least one corrupted data channel is a result of noise due to sources external to the fiber optic cable, time-varying noise sources within the fiber optic cable, or proximity to a termination of the fiber optic cable.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. It should be understood that various changes, substitutions and alterations can be made herein without departing from the spirit and scope of the disclosure as defined by the claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method, comprising:
analyzing a collected dataset, wherein the collected dataset comprises a plurality of data channels of acoustic data;
identifying among the plurality of data channels at least one corrupted data channel;
determining at least one interpolated data channel by applying an interpolation scheme selected from the group consisting of: simple linear interpolation, sync interpolation, spline interpolation, cubic interpolation, bi-cubic interpolation, image inpainting, and a combination thereof;
replacing the at least one corrupted data channel from the collected dataset with the at least one interpolated data channel to generate an interpolated dataset;
applying a filter to the interpolated dataset to generate a filtered dataset; and
downsampling the filtered dataset, whereby the interpolated dataset improves an accuracy of interpretation of acoustic events within the filtered, downsampled dataset.

2. The method of claim 1, further comprising zeroing data in the at least one corrupted data channel.

3. The method of claim 1, further comprising:
analyzing a second collected dataset, wherein the second collected dataset comprises a plurality of data channels of acoustic data; and stacking at least one of the plurality of data channels of the collected dataset with at least one of the plurality of data channels of the second collected dataset.

4. The method of claim 3, further comprising:
determining a quality factor for at least one of the plurality of data channels of the collected dataset and the second collected dataset; and
weighting the at least one of the data channels of the collected dataset and the second collected dataset for stacking based on the quality factor.

5. The method of claim 1, further comprising determining a common mode noise by combining data from all of the plurality of data channels that are not determined to be corrupted; and removing the common mode noise from the collected dataset.

6. The method of claim 1, further comprising selecting an interpolation scheme based on a number of identified corrupted data channels and a location of the at least one corrupted data channel.

7. The method of claim 1, wherein applying the filter comprises applying a wavenumber (k) low-pass filter to the interpolated dataset in a time-wavenumber (t-k) domain.

8. The method of claim 1, wherein applying the filter comprises applying a polygon filter to the interpolated dataset in a frequency-wavenumber (f-k) domain.

9. The method of claim 8, further comprising selecting the polygon filter to apply to the interpolated dataset based on a desired downsampled channel spacing, a minimum velocity of events expected in the collected dataset, or both.

10. The method of claim 1, further comprising:
applying a weight to each data channel of the interpolated dataset;
transforming the weighted, interpolated dataset into a time-wavenumber (t-k) domain or a frequency-wavenumber (f-k) domain using a Fourier transform;
applying the filter in the t-k domain or f-k domain;
transforming the filtered data into a time-space domain; and
unweighting the filtered data to generate the filtered dataset.

11. The method of claim 1, wherein downsampling the filtered dataset comprises dropping channel data, taking a mean or median of neighboring channels, or using a running sum.

12. The method of claim 1, further comprising acquiring the acoustic data via a distributed acoustic sensing (DAS) system by measuring backscatter from a pulse of light sent along a fiber optic cable to generate the collected dataset.

13. A tangible, non-transitory, computer-readable medium comprising machine-readable instructions to:
analyze a collected dataset, wherein the collected dataset comprises a plurality of data channels of acoustic data;
identify among the plurality of data channels at least one corrupted data channel;
determine at least one interpolated data channel by applying an interpolation scheme selected from the group consisting of: simple linear interpolation, sync interpolation, spline interpolation, cubic interpolation, bi-cubic interpolation, image inpainting, and a combination thereof;
replace the at least one corrupted data channel from the collected dataset with the at least one interpolated data channel to generate an interpolated dataset;
apply a filter to the interpolated dataset to generate a filtered dataset; and
downsample the filtered dataset, whereby the interpolated dataset improves an accuracy of interpretation of acoustic events within the filtered, downsampled dataset.

14. The tangible, non-transitory, computer-readable medium of claim 13, further comprising machine-readable instructions to zero data in the at least one corrupted data channel.

15. The tangible, non-transitory, computer-readable medium of claim 13, further comprising machine-readable instructions to:
analyze a second collected dataset, wherein the second collected dataset comprises a plurality of data channels of acoustic data; and
stack at least one of the plurality of data channels of the collected dataset with at least one of the plurality of data channels of the second collected dataset.

16. The tangible, non-transitory, computer-readable medium of claim 13, further comprising machine-readable instructions to remove a common mode noise from the collected dataset.

17. The tangible, non-transitory, computer-readable medium of claim 13, further comprising machine-readable instructions to apply the filter to the interpolated dataset in a time-wavenumber (t-k) domain or a frequency-wavenumber (f-k) domain to generate the filtered dataset.

18. A system, comprising:
a distributed acoustic sensing (DAS) interrogator box;
a processing component communicatively coupled to the DAS interrogator box; and
a memory component containing a set of instructions that, when executed by the processing component, cause the processing component to:
analyze a collected dataset received from the DAS interrogator box, wherein the collected dataset comprises a plurality of data channels of acoustic data;
identify among the plurality of data channels at least one corrupted data channel;
determine at least one interpolated data channel by applying an interpolation scheme selected from the group consisting of: simple linear interpolation, sync interpolation, spline interpolation, cubic interpolation, bi-cubic interpolation, image inpainting, and a combination thereof;
replace the at least one corrupted data channel from the collected dataset with the at least one interpolated data channel to generate an interpolated dataset;
apply a filter to the interpolated dataset to generate a filtered dataset; and
downsample the filtered dataset, whereby the interpolated dataset improves an accuracy of interpretation of acoustic events within the filtered, downsampled dataset.

19. The system of claim 18, further comprising a fiber optic cable coupled to the DAS interrogator box, wherein the fiber optic cable is at least partially disposed in a wellbore for collecting vertical seismic profile (VSP) measurements, and wherein the at least one corrupted data channel is a result of noise due to sources external to the fiber optic cable, time-varying noise sources within the fiber optic cable, or proximity to a termination of the fiber optic cable.

20. The method of claim 1, further comprising:
collecting the dataset via a fiber optic cable positioned in a wellbore while an acoustic source outputs a controlled acoustic signal toward the wellbore; and
interpreting the acoustic events of the downsampled, filtered dataset caused by the emission of the controlled acoustic signal from the acoustic source to determine one or more properties of a subterranean formation through which the wellbore extends.

\* \* \* \* \*